United States Patent [19]

Boteler

[11] 4,062,470
[45] Dec. 13, 1977

[54] ELECTRICAL OUTLET BOX MOUNTING ASSEMBLY

[75] Inventor: William C. Boteler, Northport, N.Y.
[73] Assignee: Slater Electric Inc., Glen Cove, N.Y.
[21] Appl. No.: 711,516
[22] Filed: Aug. 4, 1976
[51] Int. Cl.² .......................... H02G 3/08; F16B 2/24
[52] U.S. Cl. ..................................... 220/3.3; 220/3.9; 248/205 R; 248/DIG. 6
[58] Field of Search ............. 220/3.2, 3.3, 3.4, 3.5, 220/3.6, 3.7, 3.8, 3.9, 3.92, 3.94; 174/58; 248/205 R, DIG. 6

[56] References Cited

U.S. PATENT DOCUMENTS

| 1,026,146 | 5/1912 | Hoffman | 220/3.9 |
| 2,149,719 | 3/1939 | Arnest | 220/3.4 |
| 2,644,600 | 7/1953 | Senif | 220/3.9 |
| 2,684,220 | 7/1954 | Beber et al. | 220/3.5 X |
| 2,769,562 | 11/1956 | Rudolph | 220/3.4 |
| 3,575,313 | 4/1971 | Trachtenberg et al. | 174/58 X |
| 3,834,658 | 9/1974 | Theodorides | 220/3.9 X |
| 3,863,037 | 1/1975 | Schindler et al. | 220/3.9 X |
| 3,952,906 | 4/1976 | Georgopulos | 220/3.3 X |
| 3,972,498 | 8/1976 | Paskert | 220/3.9 X |

FOREIGN PATENT DOCUMENTS

| 1,080,655 | 4/1960 | Germany | 174/58 |

Primary Examiner—Stephen Marcus
Attorney, Agent, or Firm—Morgan, Finnegan, Pine, Foley & Lee

[57] ABSTRACT

At least one sidewall of the electrical outlet box is formed with boss members defining slots for receiving and retaining the attaching portion of a generally L-shaped mounting bracket which also includes a mounting portion adapted to be secured to a suitable support structure. As preferably embodied, the outlet box is made of a moldable plastic material and includes wedge-like restraining means on the sidewall for ratcheting into an aperture formed in the attaching portion of the bracket when the bracket is fully seated in the slots in order to prevent removal of the bracket from the outlet box.

15 Claims, 3 Drawing Figures

ELECTRICAL OUTLET BOX MOUNTING ASSEMBLY

BACKGROUND AND OBJECTS OF THE INVENTION

The present invention relates generally to electrical outlet or junction boxes (hereinafter, "electrical outlet boxes") and more particularly to molded plastic electrical outlet boxes adapted for mounting to a suitable wall-support structure such as a sheet metal stud.

In most residential applications, electrical outlet boxes are secured to wooden studs (which support a wallboard) by nails inserted through nail guide structures formed on the box. However, in several important applications, such as in mobile homes, business offices, etc., the studs supporting the wallboard are made of sheet metal. In such applications, it is impractical to use nails for mounting the box to the stud. Accordingly, blank outlet boxes (i.e. formed without nail guides) are fitted with a mounting bracket suited for permanent attachment to the stud.

Heretofore, one way of attaching the mounting bracket to the outlet box consists of molding the bracket into, and as part of, one of the sidewalls of the outlet box. However, although such attachment may be adequate for some applications, it necessarily complicates fabrication of the box, thereby increasing the associated costs, and may cause a weakening in the sidewall in which the bracket is molded.

Another way of attaching the mounting bracket to the outlet box consists of bolting the bracket directly to a sidewall or to the backwall. Such attachment may be adequate, but complicates installation and requires numerous parts, thereby increasing fabrication costs as well as installation time.

Still another way of attaching the mounting bracket to the outlet box includes a bracket member having bent arms to engage extensions formed in the box, as disclosed in U.S. Pat. No. Re. 25,593 issued to Palmer. Although such attachment may be adequate, both the mounting bracket as well as the molded outlet box are of substantially complicated design, thereby complicating fabrication and increasing costs thereof.

It is therefore an object of the present invention to provide a new and improved electrical outlet box mounting assembly. Another object of the invention is to provide a new and improved electrical outlet box mounting assembly for mounting an outlet box formed without nail guide members to a support stud and the like.

It is also an object of the invention to provide a new and improved electrical outlet box mounting assembly wherein the outlet box can be made of a moldable plastic material independently of the mounting bracket.

It is still another object of the present invention to provide a new and improved electrical outlet box mounting assembly capable of relatively easy and inexpensive fabrication as well as simple assembly and installation.

It is a further object of the present invention to provide a new and improved electrical outlet box and associated mounting bracket capable of "snap" lockable interconnection.

Objects and advantages of the invention are set forth in part herein and in part will be appreciated herefrom, or may be learned by practice with the invention, the same being realized and attained by means of the instrumentalities and combinations pointed out in the appended claims. Accordingly, the invention is believed to reside in the novel parts, structures, arrangements, combinations and improvements herein shown and described.

SUMMARY OF THE INVENTION

Briefly described, the electrical outlet box mounting assembly according to the present invention includes an electrical outlet box having at least one flat sidewall portion, a mounting bracket having a substantially flat attaching portion for attachment to the flat sidewall portion of the box and slot means formed on the flat sidewall portion of the box, adapted for slidably receiving the attaching portion of the mounting bracket. The mounting bracket also includes a mounting portion adapted to be secured to a suitable support structure.

Advantageously, and as here preferably embodied, the flat sidewall portion is formed with wedge-like detent or restraining means and the attaching portion of the bracket includes an aperture sized and positioned to receive the restraining means when fully seated in the slots, for preventing removal of the bracket from the slot means. Also as preferably embodied, the outlet box is made of a moldable plastic material and having boss means formed on the flat portion of the sidewall, which comprise lateral portions defining slots with the sidewall and transverse portions defining stop means for limiting slidable insertion of the bracket into the slots to a predetermined position. In addition, the attaching portion of the mounting bracket is formed with a lip inclined at a small angle with respect to the attaching portion, and positioned to correspond to the restraining means.

It will be apparent from the foregoing general description that the objects of the invention specifically enumerated herein are accomplished by the invention. Accordingly, it has been found that the electrical outlet box and the mounting bracket can be easily and simply fabricated independently of each other. Moreover, the outlet box and mounting bracket can be packaged in disassembled form to economize on valuable freight and shipping space, and can be assembled in seconds for simple and fast mounting to a suitable support structure.

It has also been found that by providing slots on the sidewall of the outlet box to receive the attaching portion of the mounting bracket, the box can be conveniently molded from a moldable plastic material while the bracket can be made of metal and adapted to be received in the slots. It has also been found that by providing a wedge-like restraining member on the sidewall of the box along with a corresponding aperture in the attaching portion of the mounting bracket, the bracket may easily be slidably lockably received in the slots of the boss members for substantially permanent assembly of the box and bracket. Moreover, the ease of assembly is enhanced by forming the leading edge of the attachment portion of the bracket with an inclined ridge or lip to "ride" over the wedge-shaped restraining means.

It will be understood that the foregoing general description as well as the following detailed description are exemplary and explanatory of the invention but are not restrictive thereof. Accordingly, the accompanying drawings, referred to herein and forming a part hereof, illustrate preferred embodiments of the invention, and together with the detailed description, serve to explain the principles of the invention.

DETAILED DESCRIPTION OF A PREFERRED EMBODIMENT

Figure 1:
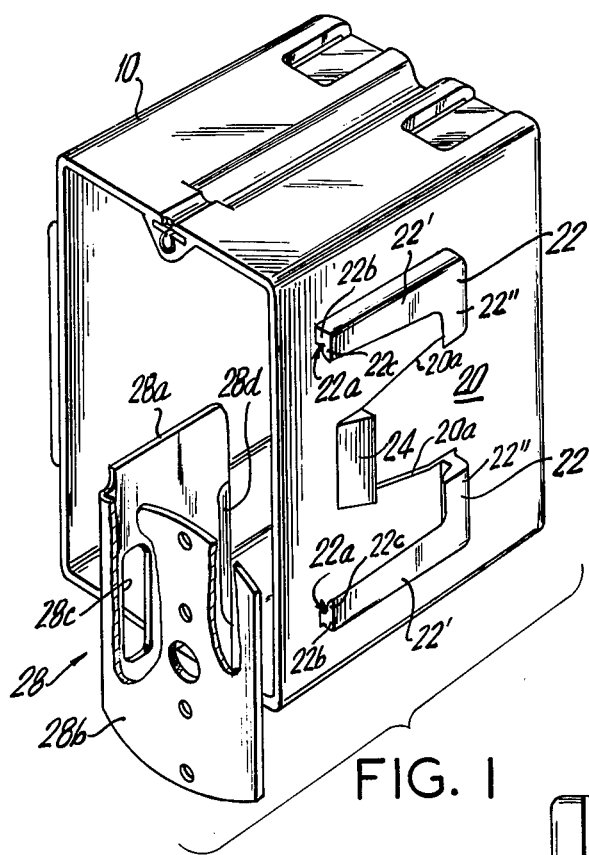
FIG. 1 is a perspective, partially cut-away, view of a disassembled electrical outlet box assembly according to the present invention.

Referring now to the accompanying drawings, wherein like reference characters refer to like parts throughout the various views, there is shown a preferred embodiment of an electrical outlet box mounting assembly according to the present invention. Referring more particularly to FIG. 1, there is shown a perspective view of the outlet box mounting assembly in its disassembled configuration.

According to the embodiment shown, the assembly includes electrical outlet box 10 and mounting bracket 28. As preferably embodied, outlet box 10 is made from a moldable plastic material, although it will be understood that any other material such as metal may be used, when desired. In addition, although outlet box 10 has been illustrated as rectangular in the accompanying drawings, it will be understood that any other conventionally shaped outlet box may be utilized, such as a round one preferably having a flat sidewall portion for attaching the mounting bracket, as described more fully hereinafter.

Mounting bracket 28 is provided with an attaching portion for attachment to box 10 and a mounting portion adapted for mounting to a suitable support structure. According to the embodiment shown in the accompanying drawings, bracket 28 is a generally L-shaped member having attaching portion or leg 28a adapted to be attached to box 10 and mounting portion or leg 28b for suitable mounting to a support structure (exemplified by stud member 40 in FIG. 3). For ease of fabrication and assembly, attaching leg 28a is formed with straight edges and the receiving means on the box are correspondingly formed, as described more fully hereinafter.

In order to attach bracket member 28 to box 10, a flat sidewall portion (indicated by reference number 20) is formed with receiving means adapted to receive and retain attaching leg 28a during assembly of the outlet box assembly according to the invention. As preferably embodied, the receiving means comprise a pair of slots 22a defined by boss means 22 formed on sidewall 20. Advantageously, boss means 22 have generally L-shaped cross-sections defining sidewall member 22b and flange portion 22c which extends generally parallel to sidewall 20 of box 10, thereby to define a generally U-shaped channel or slot 22a with sidewall 20.

Also advantageously, and as preferably embodied, boss means 22 itself is generally L-shaped, comprising lateral portion 22' for receiving the side portions of attaching leg 28a, and transverse portion 22'' for limiting further insertion of leg 28a beyond a predetermined position. Alternatively, transverse portion 22'' may not be necessary since flange portion 22c may be dimensioned to abut the mounting portion 28b of bracket 28, near its intersection with attaching portion 28a, for defining the final residence of bracket 28. However, inclusion of transverse portion 22'' is preferred for providing a more structurally strong restraining means.

Figure 2:
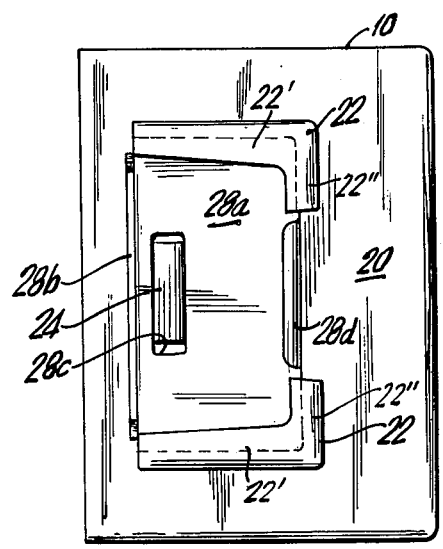
FIG. 2 is a side view of an assembled version of the embodiment of FIG. 1.

According to another aspect of the present invention, restraining means are associated between box 10 and mounting bracket 28 to prevent removal of bracket 28 after it is fully seated within slots 22a, thereby to provide lockable assembly of box 10 and bracket 28. To this end, sidewall 20 is advantageously formed with wedge-like restraining means 24, having detent surface 24a. In addition, attaching leg 28a is formed with aperture 28c, dimensioned to receive and surround restraining means 24 after full seating is achieved, as shown in FIG. 2.

During assembly, therefore, leg 28a is inserted into slots 22a, with the leading edge of leg 28a riding over restraining means 24, causing sidewall 20 of plastic outlet box 10 to be deflected slightly inwardly as it rides over wedge 24. Essentially simultaneous with the full seating of attaching portion 28a in slots 22a, wedge 24 "snaps" into aperture 28c in a ratchet-like manner. Detent surface 24a is thereby in generally abutting relation with the front edge of aperture 28c to substantially prevent removal of leg 28a from slots 22a and maintain a generally permanent attachment between box 10 and bracket 28.

According to another aspect of the invention, the leading edge of leg 28a is formed with upturned lip 28d to facilitate the travel over wedge 24, as the leading edge initially engages wedge 24. As preferably embodied, the length of the leading edge along which lip 28d is formed is generally as wide as the corresponding width of wedge 24. In addition, lip 28d is positioned to correspond to the position of wedge 24.

Figure 3:
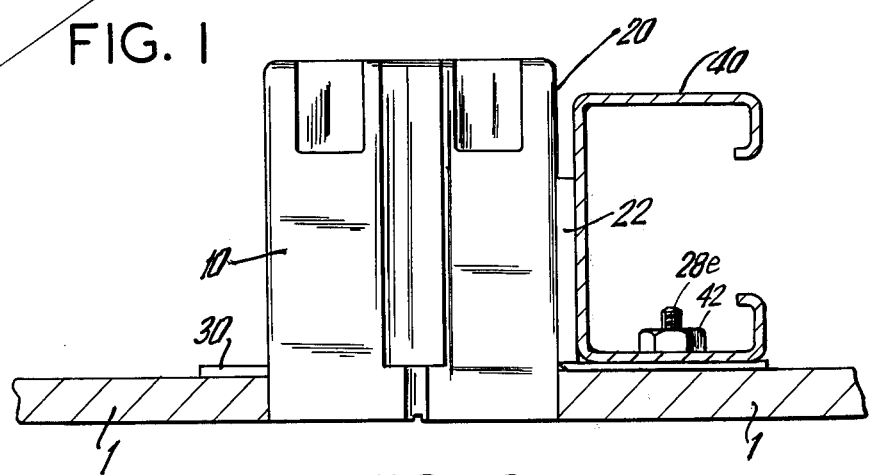
FIG. 3 is a top view of an embodiment of the present invention showing exemplary installation.

Referring now to FIG. 3, there is shown a particularly useful installation of the electrical outlet box assembly according to the present invention, where the support structure is a steel sheet metal stud (indicated at 40). Accordingly, any convenient structure may be used for mounting to support 40, such as, for example, threaded shaft 28e formed on mounting leg 28b for insertion through a hole formed in stud 40. Thus, when sidewall 20 of box 10 is suitably placed adjacent stud 40 with boss means 22 bearing against stud 40 and threaded shaft 28e inserted through a hole in stud 40, nut 42 may be threaded thereon for fastening the box to the stud. Thereafter, wall board 1 can be appropriately attached to stud 40, with a suitable opening permitting access to the front of outlet box 10.

If the support structure is a wooden stud, shaft 28e can be a simple pointed nail-like member which can be hammered into the stud by striking the back of leg 28b. However, it will be understood that any convenient means may be employed for attaching the box to the support structure.

In addition, it will be found that the electrical outlet box mounting assembly means according to the present invention enables the front open face of molded plastic outlet box to be oriented essentially completely perpendicular to the edge of the support stud abutting sidewall 20. Since, in molding plastic outlet boxes, it is necessary to design molds wherein the sidewalls are not perfectly perpendicular to the backwall, in order to provide draft for enabling removal of the box from the mold, the front face of a box with its sidewall flush against a flat surface will not be perfectly perpendicular to that surface. Thus, boss means 22 can be molded with a slightly increasing thickness, from the front of the box to the back, in sidewall members 22a, as indicated by the lips 20a on sidewall 20. Alternatively, L-shaped bracket 28 can be formed with a slightly greater than 90° angle between legs 28a and 28b so that when leg 28b is secured to the support stud, the back portion of sidewall 20 will be spaced slightly from the surface of the support stud.

According to another aspect of the invention, box 10 may be formed with stop means 30 on another sidewall, preferably opposite sidewall 20. This feature is particularly useful since stud 40 may not be completely steady and the edge of box 10 farthest from stud 40 could protrude slightly through the opening in wall board 1. Thus, stop 30 serves to retain the front face of box 10 flush with the front surface of wall board 1. Further to this end, boss means 22 and bracket 28 are formed such that when the outlet box assembly is installed on stud 40, wall board 1 can also be fitted with its front surface substantially flush with the front edge of sidewall 20.

If outlet box 10 is to be a large or over-sized box (greater than about 18 cubic inches), or if it is desired to mount the box to more than one stud, boss means 22 may be formed on a second sidewall, such as the one opposite sidewall 20, to permit attachment of a second mounting bracket adapted to be fastened to the second stud.

It will be readily appreciated that the invention in its broader aspects is not limited to the specific embodiment herein shown and described. Rather, variations may be made therefrom within the scope of the accompanying claims, without departing from the principles of the invention and without sacrificing its chief advantages.

For example, if a completely round outlet box is utilized, mounting leg 28a may also be rounded instead of flat so as to conveniently fit within boss means 22 formed on a curved sidewall. In addition, outlet box 10 may be metallic rather than plastic, with boss means 22 formed simply by die stamping them out of sidewall 20 and restraining means 24 formed by die stamping an inclined flange from sidewall 20.

What is claimed is:

1. An electrical outlet box mounting assembly which includes:
   at least one generally flat sidewall portion on an electrical outlet box having a generally open front face;
   a mounting bracket having an essentially flat attaching portion and a mounting portion adapted to be secured to a suitable support structure for mounting the box thereto;
   slot means formed on said sidewall portion, said slot means adapted for slidably receiving and retaining said flat attaching portion of said bracket when inserted thereinto;
   first stop means formed on said sidewall portion for preventing insertion of said attaching portion beyond a predetermined point;
   restraining means formed on said sidewall portion, said restraining means providing a detent surface; and
   receiving means formed in said attaching portion, said receiving means proportioned to generally surround said restraining means when said attaching portion is essentially fully seated in said slot means with said detent surface generally abutting an edge of said receiving means, said restraining means and said receiving means being proportioned to permit insertion of said attaching portion into said slot means yet substantially prevent withdrawal of said attaching portion from said slot means once said attaching portion is essentially fully seated in said slot means, such that said mounting bracket is lockably engageable in said slot means without threaded fasteners whereby the electrical outlet box can be mounted to the support structure by securing said mounting portion thereto.

2. An electrical outlet box mounting assembly according to claim 1 which further includes second stop means formed on a second sidewall portion, said second stop means recessed from said front of said outlet box a distance essentially equal to the thickness of the wall supported by said support member.

3. An electrical outlet box mounting assembly according to claim 1 wherein said slot means are provided by boss means formed on said sidewall portion, said boss means defining a pair of slots with said sidewall portion for slidably receiving said attaching portion of said bracket, and providing said first stop means for restricting slidable insertion of said attaching portion into said slots beyond a predetermined position.

4. An electrical outlet box mounting assembly according to claim 3 wherein said mounting bracket comprises a generally L-shaped member having an essentially flat first leg adapted for insertion into said slots defined by said boss means and a second leg adapted to be secured to the support structure.

5. An electrical outlet box mounting assembly according to claim 4 wherein said restraining means comprises detent means formed on said sidewall portion and said receiving means comprises an aperture formed in said first leg for lockably engaging said detent means, such that said detent means permits insertion of said first leg into said slots defined by said boss members, yet substantially prevents removal of said first leg from said slots after said first leg is fully seated in said slots, to provide a generally permanent coupling between said outlet box and said mounting bracket.

6. An electrical outlet box mounting assembly according to claim 5 wherein the electrical outlet box is made from a moldable plastic material.

7. An electrical outlet box mounting assembly according to claim 6 wherein said detent means comprises a generally wedge-like member formed on said sidewall portion, said wedge-like member being inclined in the direction of insertion of said first leg and forming said detent surface generally perpendicular to said sidewall portion at its rearward edge, and wherein said first leg is formed with an aperture positioned and dimensioned to surround said wedge-like member when said first leg is fully seated in said slots, such that during insertion of said first leg into said slots, said sidewall portion resiliently yields inwardly as said first leg rides over said wedge-like member until said wedge-like member snaps into said aperture when said first leg is essentially fully seated in said slots, with said detent surface generally abutting an edge of said aperture to substantially prevent removal of said first leg from said slots.

8. An electrical outlet box mounting assembly according to claim 7 wherein the edge of the free end of said first leg is provided with a lip inclined at generally the same angle as said wedge-like member and positioned for alignment therewith during insertion to facilitate sliding of said edge over said wedge-like member.

9. An electrical outlet box mounting assembly according to claim 8 which further includes second stop means formed on a second sidewall, portion said second stop means recessed from said front of said outlet box a distance essentially equal to the thickness of the wall supported by said support member.

10. An electrical outlet box mounting assembly according to claim 8 wherein said first and second legs of said mounting bracket intersect such that when said first leg is lockably received in said slot means, said second leg defines a plane essentially parallel to the plane defined by the front face of the outlet box.

11. An electrical outlet box mounting assembly which includes:
   at least one generally flat sidewall portion of a molded plastic electrical outlet box;
   a mounting bracket having an essentially flat attaching portion and a mounting portion adapted to be secured to a suitable support structure for mounting the box thereto, said attaching portion having an aperture formed therein;
   boss means formed on said sidewall portion, defining a pair of slots with said sidewall portion, said slots adapted to slidably receive said attaching portion, and said boss means providing a stop for restricting slidable insertion of said attaching portion into said slots beyond a predetermined position;
   detent means formed on said sidewall portion, said detent means comprising a generally wedge-shaped member inclined in the direction of insertion of said attaching portion, a detent surface formed at its rearward edge, generally perpendicular to said sidewall portion, said aperture in said attaching portion being positioned and dimensioned to generally surround said detent means when said attaching leg is fully seated in said slots,
   such that during insertion of said attaching portion into said slots, said sidewall portion generally resiliently yields inwardly as said attaching portion rides over said wedge-shaped detent means until said detent means snaps into said aperture when said attaching portion is essentially fully seated in said slots, with said detent surface generally abutting on edge of said aperture to substantially prevent removal of said attaching portion from said slots.

12. An electrical outlet box mounting assembly according to claim 11 wherein the edge of the free end of said attaching portion is provided with a lip inclined at generally the same angle as said wedge-shaped member and positioned for alignment therewith during insertion to facilitate sliding of said edge over said wedge-sahped member.

13. An electrical outlet box mounting assembly according to claim 12 which further includes stop means formed on a second sidewall portion, said stop means recessed from said front of said outlet box a distance essentially equal to the thickness of the wall supported by said support member.

14. An electrical outlet box mounting assembly according to claim 12 wherein said mounting bracket comprises a generally L-shaped member having an essentially flat first leg adapted for insertion into said slots and a second leg adapted to be secured, to the support structure.

15. An electrical outlet box mounting assembly according to claim 14 wherein said first and second legs of said mounting bracket intersect such that when said first leg is lockably received in said slot means, said second leg defines a plane essentially parallel to the plane defined by the front face of the outlet box.

* * * * *

UNITED STATES PATENT AND TRADEMARK OFFICE
CERTIFICATE OF CORRECTION

PATENT NO. : 4,062,470
DATED : December 13, 1977
INVENTOR(S) : William C. Boteler It is certified that error appears in the above–identified patent and that said Letters Patent are hereby corrected as shown below:

Claim 9, line 3, the comma should be deleted after "sidewall" and inserted after "portion";

Claim 12, line 6, "wedge-sahped" should be --wedge-shaped--;

Claim 14, line 5, the comma should be deleted after "secured".

Signed and Sealed this

Sixteenth Day of May 1978

[SEAL]

Attest:

RUTH C. MASON
Attesting Officer

LUTRELLE F. PARKER
Acting Commissioner of Patents and Trademarks